United States Patent [19]
Redlich

[11] Patent Number: 5,967,488
[45] Date of Patent: Oct. 19, 1999

[54] ELECTRICALLY ACTUATED REED VALVE

[76] Inventor: Robert Walter Redlich, 9 Grand Park Blvd., Athens, Ohio 45701

[21] Appl. No.: 09/087,115

[22] Filed: May 29, 1998

[51] Int. Cl.[6] .................................................... F16K 31/02
[52] U.S. Cl. .................................. 251/129.2; 251/129.01; 251/129.15; 137/522
[58] Field of Search ..................... 251/129.01, 129.15, 251/129.2, 82; 137/84, 522

[56] References Cited

U.S. PATENT DOCUMENTS

| | | | |
|---|---|---|---|
| 1,767,058 | 6/1930 | Eiseman | 251/129.2 X |
| 2,831,649 | 4/1958 | Hayslett | 251/129.2 X |
| 3,446,472 | 5/1969 | Freeman | 251/129.01 X |
| 4,170,339 | 10/1979 | Ueda et al. | 251/129.2 |
| 4,459,819 | 7/1984 | Hargraves . | |
| 4,472,091 | 9/1984 | Callahan | 251/129.01 X |
| 4,561,631 | 12/1985 | Slavin et al. | 251/129.2 |
| 5,098,062 | 3/1992 | Lungu | 251/129.2 X |
| 5,388,984 | 2/1995 | Meslif | 251/129.01 X |
| 5,417,235 | 5/1995 | Wise et al. | 251/129.01 X |
| 5,593,134 | 1/1997 | Steber et al. | 251/129.01 X |

*Primary Examiner*—John Rivell
*Attorney, Agent, or Firm*—Frank H. Foster; Kremblas, Foster, Millard & Pollick

[57] ABSTRACT

Disclosed is a reed valve which uses a simple electromechanical actuator to apply a force that overcomes pressure force and opens the valve. The valve is closed by pressure and the elastic restoring force of the reed. Two of the disclosed valves in a back-to-back connection accommodate bi-directional flow. The disclosed valve is especially suited for application as a pulsed expansion valve for refrigerators and heat pumps.

3 Claims, 4 Drawing Sheets

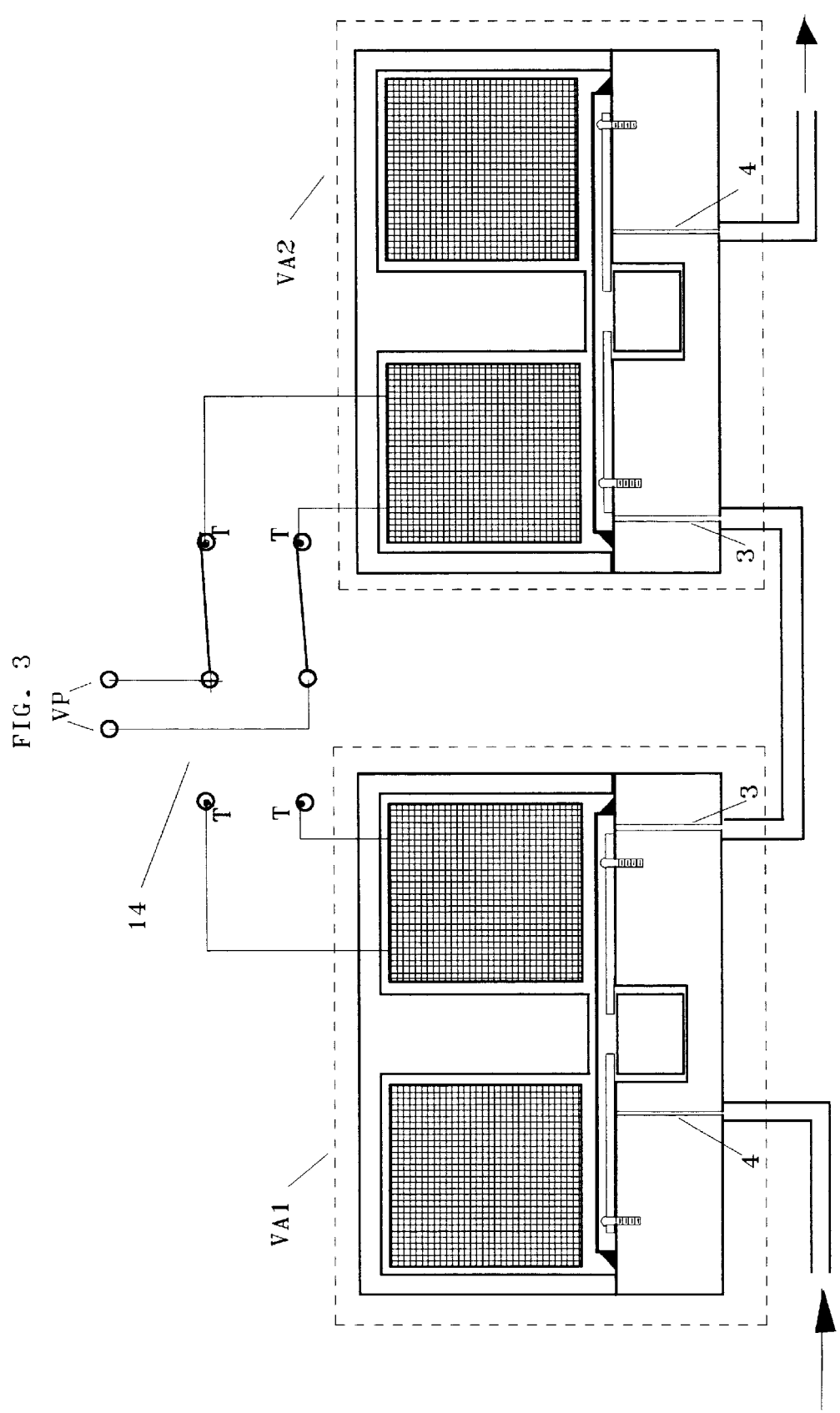

ELECTRICALLY ACTUATED REED VALVE

TECHNICAL FIELD

This invention generally relates to electromechanical valves. The invention is particularly suited for service as a pulsed electromechanical expansion valve in a refrigerator, heat pump, or air conditioner.

BACKGROUND ART

Electromechanical valves are used in large numbers in a wide variety of fluid and gas flow control applications. Desirable properties for such valves are;

low leakage,
fast response time,
low power consumption,
long life,
low cost,
ability to open with high pressure difference across the valve.

The most common type of prior art electromechanical valve is actuated by a solenoid. Solenoid actuated valves have a definitely limited life, may use significant power, are slow to respond except in small sizes, and require special design if they are to be capable of opening with high pressure difference across the valve. The present invention does not have these shortcomings; it uses little power, responds quickly, opens easily with high pressure difference across the valve, is inexpensive, and is believed to have practically unlimited life. These attributes make it suitable for general application, but particularly suitable as a pulsed expansion valve for refrigeration and air conditioning (U.S. Pat. No. 4,459,819). A pulsed expansion valve must function reliably for years, be very inexpensive, be capable of opening with a pressure difference of at least 300 psi, have fast response to actuating voltage, and have very low leakage. No prior art electromechanical valve has all these properties. For this reason, among others, pulsed expansion valves are not in common use despite their energy saving advantages. The present invention therefore meets a hitherto unmet condition for a practical pulsed expansion valve.

BRIEF DISCLOSURE OF THE INVENTION

The invention uses a thin, flexible steel reed to seal and unseal a hole in a seating surface. Unlike prior art reed valves, which are passive check valves that are opened by pressure and closed by elasticity of the reed augmented by reverse pressure, the reed used in the invention is opened by a simple electromagnetic actuator. The pressure across a valve according to the invention is normally in the direction that holds the valve closed. The valve is thus held closed by pressure and by elastic force of the reed unless the electromagnetic actuator is energized, whereupon the valve is forced to open by magnetic forces acting on a small ferromagnetic piston. When the actuator is de-energized, the valve closes in response to pressure and elastic force of the reed itself. The basic invention is a unidirectional valve, that is, it passes flow in only one direction. A bi-directional valve, such as is needed for a pulsed expansion valve in a heat pump, can be made by connecting two basic valves according to the invention back-to-back, with either the two outlets or the two inlets connected by a passage. In the bi-directional embodiment, the actuator of one of the basic valves is energized to open that valve, and the other valve acts as a passive check valve.

BRIEF DESCRIPTION OF THE DRAWINGS

FIG. 3 is a bi -directional valve, in which the inlets of two unidirectional valves according to the invention are connected by a passage.

DETAILED DESCRIPTION OF THE INVENTION

Figure 1A:
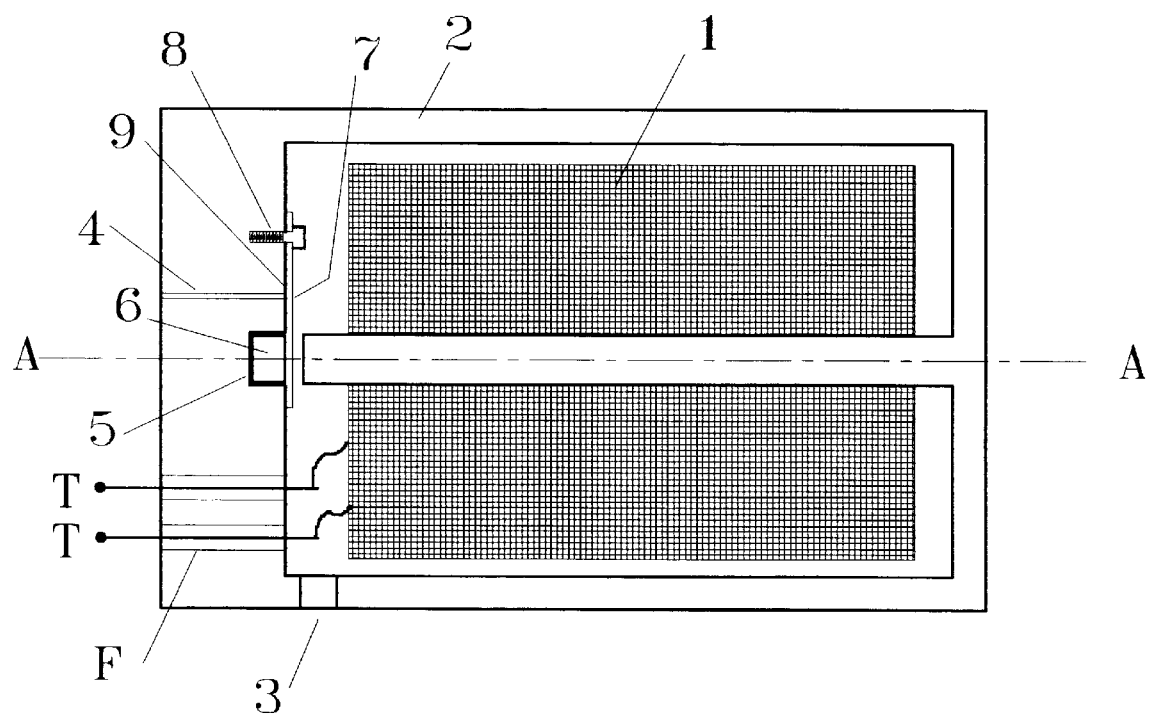
FIG. 1A is a cross sectional view of a basic unidirectional valve according to the invention. In this embodiment, the coil of wire which carries electric current that creates magnetic force to open the valve is located inside the valve chamber and is immersed in the fluid or vapor passed by the valve.
Figure 1B:
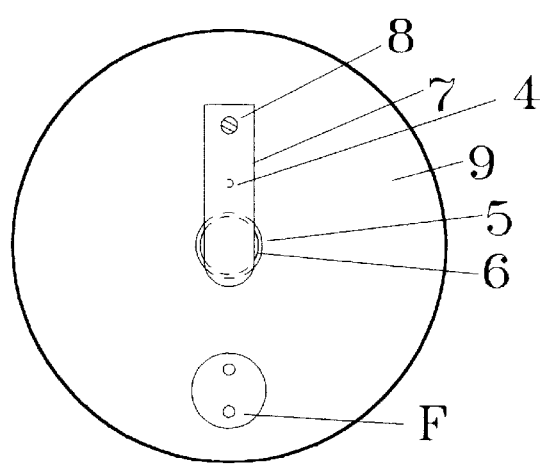
FIG. 1B is a plan view of the valve seat surface of the embodiment of FIG. 1A.

FIGS. 1A and 1B are a basic embodiment of the invention, in which 2 is a ferromagnetic path for magnetic flux. 2 forms a closed valve chamber that is axially symmetric around axis A—A and has an inlet passage 3 and an outlet passage 4. Outlet passage 4 is blocked by metal reed 7 unless an energizing voltage is applied to terminals T, which are connected by feedthrough F to the ends of coil 1. Upon application of voltage to terminals T, electric current flows in coil 1 and generates a magnetic field in 2 which exerts a force, directed toward the right in FIG. 1A, on ferromagnetic piston 6. Since piston 6 is free to move in cylinder 5, any magnetic force on it is applied to reed 7, which then bends around the point where it is attached to valve seat surface 7 by fastener 8, thereby unblocking outlet passage 4. When energizing voltage is removed, elastic forces in reed 7 straighten it and cause outlet passage 4 to again be blocked.

Figure 2A:
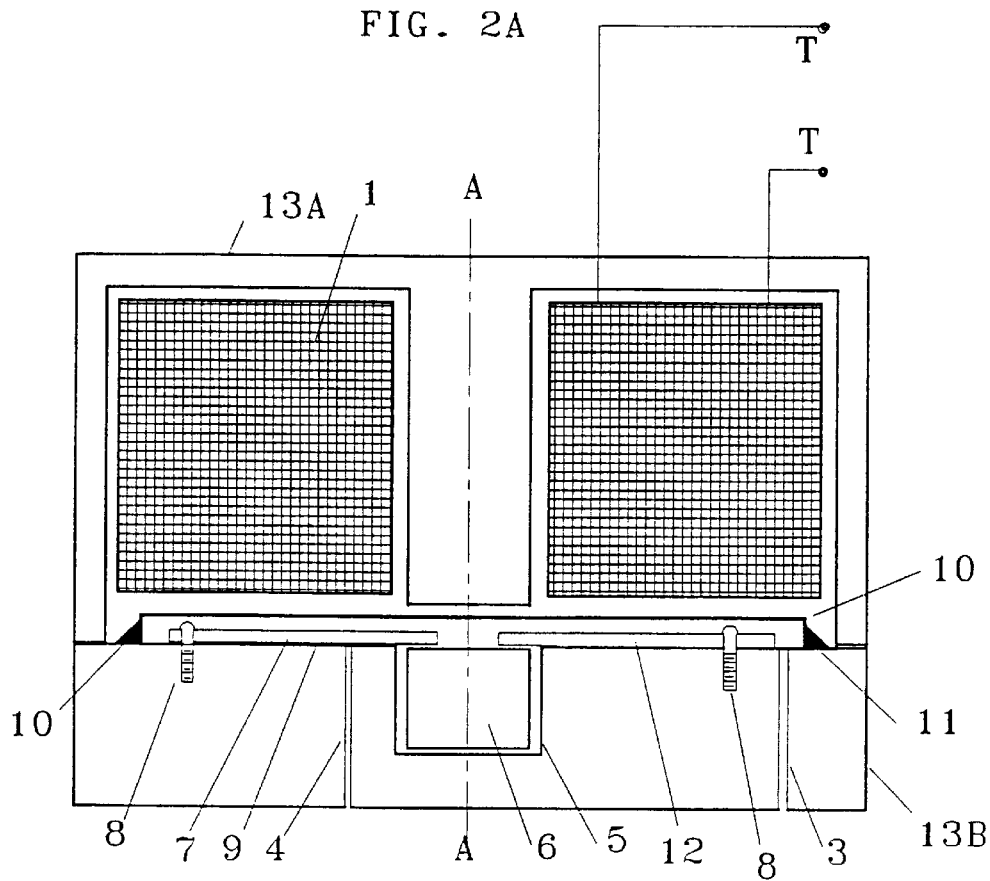
FIG. 2A is a cross sectional view of a preferred embodiment of a unidirectional valve according to the invention. In this embodiment, the coil of wire which carries electric current that creates magnetic force to open the valve is outside the valve chamber.
Figure 2B:
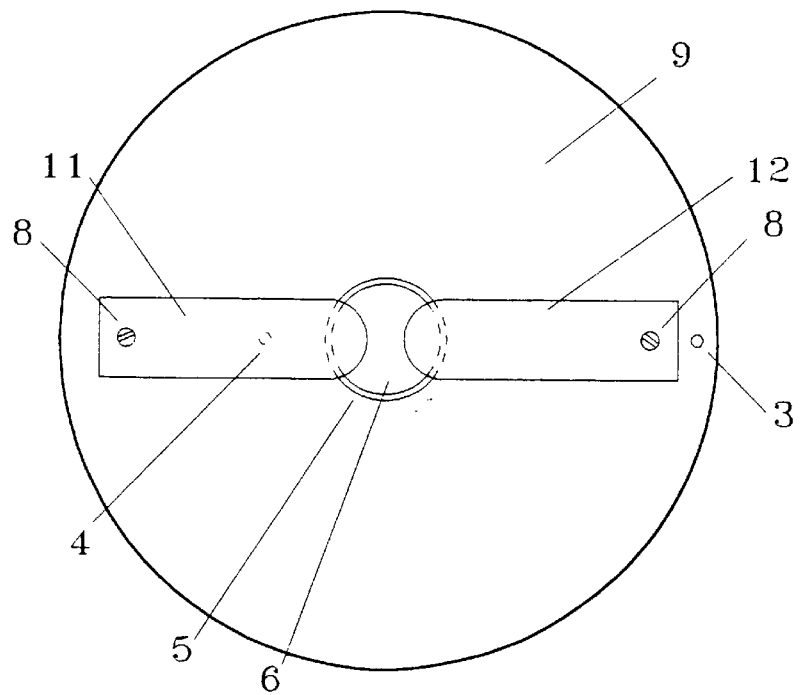
FIG. 2B is a plan view of the valve seat surface of the embodiment shown in FIG. 2A

FIGS. 2A and 2B shows a preferred embodiment of the invention, in which coil 1 is outside the valve chamber. This construction reduces cost by eliminating feedthrough F. The preferred embodiment also differs from the embodiment of FIG. 1 by the addition of dummy reed 12, whose purpose is to counterbalance torque applied to piston 6 by active reed 7 when coil 1 is energized with voltage at terminals T.

In the preferred embodiment, a valve chamber is formed by a non-ferromagnetic thin walled cup 10, which is fastened to valve seat surface 9 by leakproof seal 11, which may be a brazed or welded joint.

Also in the preferred embodiment, the ferromagnetic flux path is in two parts; 13A which is completely outside the valve chamber and 13B, which includes valve seat surface 9 and cylinder 5 within which ferromagnetic piston 5 is free to reciprocate in the direction of axis AA. Flux path 13A need not be axially symmetric; it could for example be a stack of electrical steel laminations of E-shape as shown in FIG. 2A, with coil 1 wound around the center leg as shown.

Figure 4:
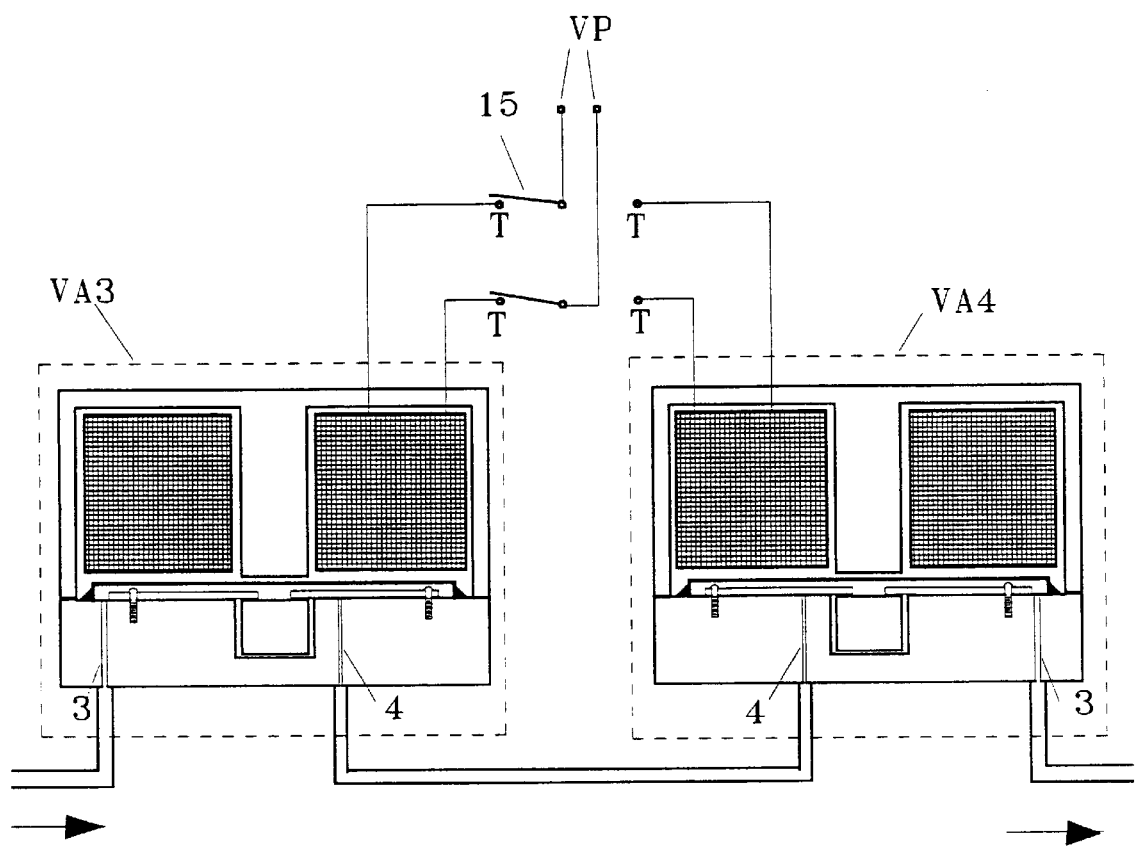
FIG. 4 is a bi-directional valve, in which the outlets of two unidirectional valves according to the invention are connected by a passage.

Neither the basic or preferred embodiments of the invention as so far disclosed will function if pressure on the outlet is higher than pressure on the inlet, because in that case pressure force will open the valve even with no current through coil 1. In some applications, for example a pulsed expansion valve for a heat pump, a bi-directional electromagnetic valve that blocks or unblocks a passage, and that will function regardless of which end of the passage is at higher pressure, is needed. FIGS. 3 and 4 show two ways to realize a bi-directional valve. Each uses two valves according to either the basic or preferred embodiments as previously disclosed here. In FIG. 3, the outlets of the individual valves VA1 and VA2 are connected by a passage, and each of the two inlets of the individual valves functions as either an inlet or an outlet of the bi-directional valve, depending on which is at higher pressure. If higher pressure is on the inlet of VA1, flow from VA1 to VA2 is passed or blocked by respectively energizing or de-energizing VA2 with a voltage VP, and VA1 is opened by pressure forces. If high pressure is on VA2, flow from VA2 to VA1 is controlled by VA1, and VA2 is opened by pressure forces. DPDT switch 14 routes energizing voltage VP to either the right or left valve according to whether higher pressure is on the left or right. In application to a heat pump expansion valve the position of switch 14 would be changed when switching between cooling and heating. The bi-directional embodiment of FIG. 4 functions similarly to that of FIG. 3. It differs from that of FIG. 3 in that the inlets of the individual valves VA3 and VA4 are connected and the bi-directional valve inlet/outlet connections are the inlets of VA3 and VA4.

Many variations that would be obvious to one with ordinary skill in the art are possible within the spirit of the invention. For example, active and dummy reeds could be formed as a single piece of flat steel stock, or several dummy reeds could be used to provide suitable spring return force.

I claim:

1. An electrically actuated valve comprising,
   a) a valve chamber consisting of an enclosed volume having an inlet and an outlet, part of the interior boundary surface of the volume being a planar valve seat surface,
   b) an outlet passage between the interior and exterior of the valve chamber, the interior end of the outlet passage being an outlet hole in the valve seat surface,
   c) a flat, flexible reed, preferably of stainless steel, attached at one or more points to the valve seat surface, and extending over the outlet hole so that the outlet hole is covered and sealed by the reed unless force is applied to the reed to lift it away from the valve seat surface,
   d) an electromechanical actuator for applying force to the reed in order to lift it away from the valve seat surface and thereby uncover the outlet hole, the electromechanical actuator consisting of;
      a ferromagnetic path for magnetic flux, said path having a gap within which is all or part of the reed,
      a recess in said valve seat surface; the recess being located under that part of the reed which is within said gap,
      a ferromagnetic body within said recess and free to move in a direction perpendicular to said valve seat surface,
      a coil of electrically conducting wire located so that electric current flowing through the wire generates a magnetic field in said gap.

2. A bi-directional, electrically actuated valve comprising a first electrically actuated valve according to claim 1 whose outlet is connected through a passage to the outlet of a second electrically actuated valve according to claim 1.

3. A bi-directional, electrically actuated valve comprising a first electrically actuated valve according to claim 1 whose inlet is connected through a passage to the inlet of a second electrically actuated valve according to claim 1.

* * * * *